United States Patent
Dry

[19]

[11] Patent Number: 6,143,054
[45] Date of Patent: Nov. 7, 2000

[54] PROCESS OF PRODUCING MOLTEN METALS

[75] Inventor: Rodney James Dry, City Beach, Australia

[73] Assignee: Technological Resources Pty Ltd., Melbourne, Australia

[21] Appl. No.: 09/160,913

[22] Filed: Sep. 25, 1998

[30] Foreign Application Priority Data

Sep. 26, 1997 [AU] Australia .................... PO9446

[51] Int. Cl.⁷ ...................................... C21B 11/00
[52] U.S. Cl. ................... 75/500; 75/501; 75/502
[58] Field of Search ............... 75/500, 501, 502

[56] References Cited

U.S. PATENT DOCUMENTS

| | | |
|---|---|---|
| Re. 33,464 | 11/1990 | Gitman . |
| 2,647,045 | 7/1953 | Rummel . |
| 3,844,770 | 10/1974 | Nixon . |
| 3,845,190 | 10/1974 | Yosim et al. . |
| 3,888,194 | 6/1975 | Kishigami et al. . |
| 3,890,908 | 6/1975 | von Klenck et al. . |
| 3,894,497 | 7/1975 | Helke et al. . |
| 4,007,034 | 2/1977 | Hartwig et al. . |
| 4,053,301 | 10/1977 | Stephens, Jr. . |
| 4,145,396 | 3/1979 | Grantham . |
| 4,177,063 | 12/1979 | Dickson . |
| 4,207,060 | 6/1980 | Zangs . |
| 4,356,035 | 10/1982 | Brotzmann et al. . |
| 4,389,043 | 6/1983 | Weber et al. . |
| 4,400,936 | 8/1983 | Evans . |
| 4,402,274 | 9/1983 | Meenan et al. . |
| 4,431,612 | 2/1984 | Bell et al. . |
| 4,447,262 | 5/1984 | Gay et al. . |
| 4,455,017 | 6/1984 | Wunsche . |
| 4,468,298 | 8/1984 | Byrne et al. . |
| 4,468,299 | 8/1984 | Byrne et al. . |
| 4,468,300 | 8/1984 | Byrne et al. . |
| 4,481,891 | 11/1984 | Takeshita et al. . |
| 4,504,043 | 3/1985 | Yamaoka et al. . |
| 4,511,396 | 4/1985 | Nixon . |
| 4,565,574 | 1/1986 | Katayama et al. . |
| 4,566,904 | 1/1986 | von Bogdandy et al. . |

(List continued on next page.)

FOREIGN PATENT DOCUMENTS

| | | |
|---|---|---|
| 23864/84 | 1/1984 | Australia . |
| B-41064/85 | 4/1986 | Australia . |
| B-22448/88 | 5/1989 | Australia . |
| B-26831/88 | 7/1989 | Australia . |
| B-28802/89 | 8/1989 | Australia . |
| 42859/89 | 4/1990 | Australia . |
| 598237 | 5/1990 | Australia . |
| 49307/90 | 9/1990 | Australia . |
| 49309.90 | 9/1990 | Australia . |

(List continued on next page.)

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.

(List continued on next page.)

*Primary Examiner*—Melvyn Andrews
*Attorney, Agent, or Firm*—Merchant & Gould P.C.

[57] ABSTRACT

A molten bath-based direct smelting process for producing metals from metal oxides (including partially reduced metal oxides) is disclosed. The process includes causing upward movement of splashes, droplets, and streams of molten material from a metal layer (15) of the molten bath which:

(i) promotes strong mixing of metal in a slag layer (16) of the molten bath so that the slag layer (16) is maintained in a strongly reducing condition leading to FeO levels below 8 wt % based on the total weight of the slag in the slag layer (16); and (ii) extends into a space above a nominal quiescent surface of the molten bath to form a transition zone (23).

8 Claims, 1 Drawing Sheet

U.S. PATENT DOCUMENTS

| | | |
|---|---|---|
| 4,572,482 | 2/1986 | Bedell . |
| 4,574,714 | 3/1986 | Bach et al. . |
| 4,602,574 | 7/1986 | Bach et al. . |
| 4,664,618 | 5/1987 | Gitman . |
| 4,681,599 | 7/1987 | Obkircher . |
| 4,684,448 | 8/1987 | Itoh et al. . |
| 4,701,214 | 10/1987 | Kaneko et al. . |
| 4,718,643 | 1/1988 | Gitman . |
| 4,786,321 | 11/1988 | Hoster et al. . |
| 4,790,516 | 12/1988 | Sugiura et al. . |
| 4,798,624 | 1/1989 | Brotzmann et al. . |
| 4,849,015 | 7/1989 | Fassbinder et al. . |
| 4,861,368 | 8/1989 | Brotzmann et al. . |
| 4,874,427 | 10/1989 | Hamada et al. . |
| 4,890,562 | 1/1990 | Gitman . |
| 4,913,734 | 4/1990 | Romenets et al. . |
| 4,923,391 | 5/1990 | Gitman . |
| 4,940,488 | 7/1990 | Maeda et al. ............................. 75/500 |
| 4,946,498 | 8/1990 | Weber . |
| 4,976,776 | 12/1990 | Elvander et al. . |
| 4,999,097 | 3/1991 | Sadoway . |
| 5,005,493 | 4/1991 | Gitman . |
| 5,024,737 | 6/1991 | Claus et al. . |
| 5,037,608 | 8/1991 | Tarcy et al. . |
| 5,042,964 | 8/1991 | Gitman . |
| 5,050,848 | 9/1991 | Hardie et al. . |
| 5,051,127 | 9/1991 | Hardie et al. . |
| 5,065,985 | 11/1991 | Takahashi et al. . |
| 5,177,304 | 1/1993 | Nagel . |
| 5,191,154 | 3/1993 | Nagel . |
| 5,222,448 | 6/1993 | Morgenthaler et al. . |
| 5,238,646 | 8/1993 | Tarcy et al. . |
| 5,271,341 | 12/1993 | Wagner . |
| 5,279,715 | 1/1994 | La Camera et al. . |
| 5,301,620 | 4/1994 | Nagel et al. . |
| 5,302,184 | 4/1994 | Batterham et al. . |
| 5,322,547 | 6/1994 | Nagel et al. . |
| 5,332,199 | 7/1994 | Knapp et al. . |
| 5,333,558 | 8/1994 | Lees, Jr. . |
| 5,396,850 | 3/1995 | Conochie et al. . |
| 5,401,295 | 3/1995 | Brotzmann . |
| 5,407,461 | 4/1995 | Hardie et al. . |
| 5,415,742 | 5/1995 | La Camera et al. . |
| 5,443,572 | 8/1995 | Wilkison et al. . |
| 5,480,473 | 1/1996 | Hardie et al. . |
| 5,489,325 | 2/1996 | Keogh et al. . |
| 5,498,277 | 3/1996 | Floyd et al. . |
| 5,518,523 | 5/1996 | Brotzmann . |
| 5,529,599 | 6/1996 | Calderon . |
| 5,613,997 | 3/1997 | Satchell, Jr. . |
| 5,640,708 | 6/1997 | Conochie et al. . |
| 5,647,888 | 7/1997 | Keogh et al. . |
| 5,741,349 | 4/1998 | Hubble et al. . |
| 5,800,592 | 9/1998 | den Hartog et al. . |
| 5,802,097 | 9/1998 | Gensini et al. . |
| 5,938,815 | 8/1999 | Satchell, Jr. . |
| B1 4,940,488 | 8/1999 | Maeda et al. ............................. 75/500 |

FOREIGN PATENT DOCUMENTS

| | | |
|---|---|---|
| B-74840/91 | 10/1991 | Australia . |
| B-90957/91 | 8/1992 | Australia . |
| 48938/93 | 4/1994 | Australia . |
| B-48937/93 | 5/1994 | Australia . |
| 678746 | 5/1997 | Australia . |
| 079 182 A1 | 5/1983 | European Pat. Off. . |
| 084 288 A1 | 7/1983 | European Pat. Off. . |
| 422 309 A1 | 4/1991 | European Pat. Off. . |
| 541 269 | 5/1993 | European Pat. Off. . |
| 592 830 A1 | 4/1994 | European Pat. Off. . |
| 657 550 | 6/1995 | European Pat. Off. . |
| 3139375 | 4/1983 | Germany . |
| 3244744 | 5/1984 | Germany . |
| 2 043 696 | 10/1980 | United Kingdom . |
| 2 088 892 | 6/1982 | United Kingdom . |
| WO 89/01981 | 3/1989 | WIPO . |
| WO 92/12265 | 7/1992 | WIPO . |
| WO 93/06251 | 4/1993 | WIPO . |
| WO 94/19497 | 9/1994 | WIPO . |
| WO 96/19591 | 6/1996 | WIPO . |
| WO 96/31627 | 10/1996 | WIPO . |
| WO 97/17473 | 5/1997 | WIPO . |
| WO 97/20958 | 6/1997 | WIPO . |
| WO 97/23656 | 7/1997 | WIPO . |
| WO 98/27232 | 6/1998 | WIPO . |
| WO 98/27239 | 6/1998 | WIPO . |
| WO 99/16911 | 4/1999 | WIPO . |

OTHER PUBLICATIONS

Patent Abstracts of Japan, C–627, p. 109, Jp, A, 01–127613 (Kawasaki Steel Corp.), May 19, 1989.

WPAT print–out for Brazilian patent application P19400123–5 (Weber).

Patent Abstracts of Japan, C–951, JP, A, 4–63217 (Kawasaki Heavy Ind. Ltd.), Feb. 28, 1992.

Patent abstracts of Japan, C–497, p. 115, JP, A, 62–280315 (Nippon Kokan K.K), Dec. 15, 1987.

Derwent Abstract Accession No. 87–039748/06 Class Q77, JP, A, 61–295334, Dec. 26, 1986.

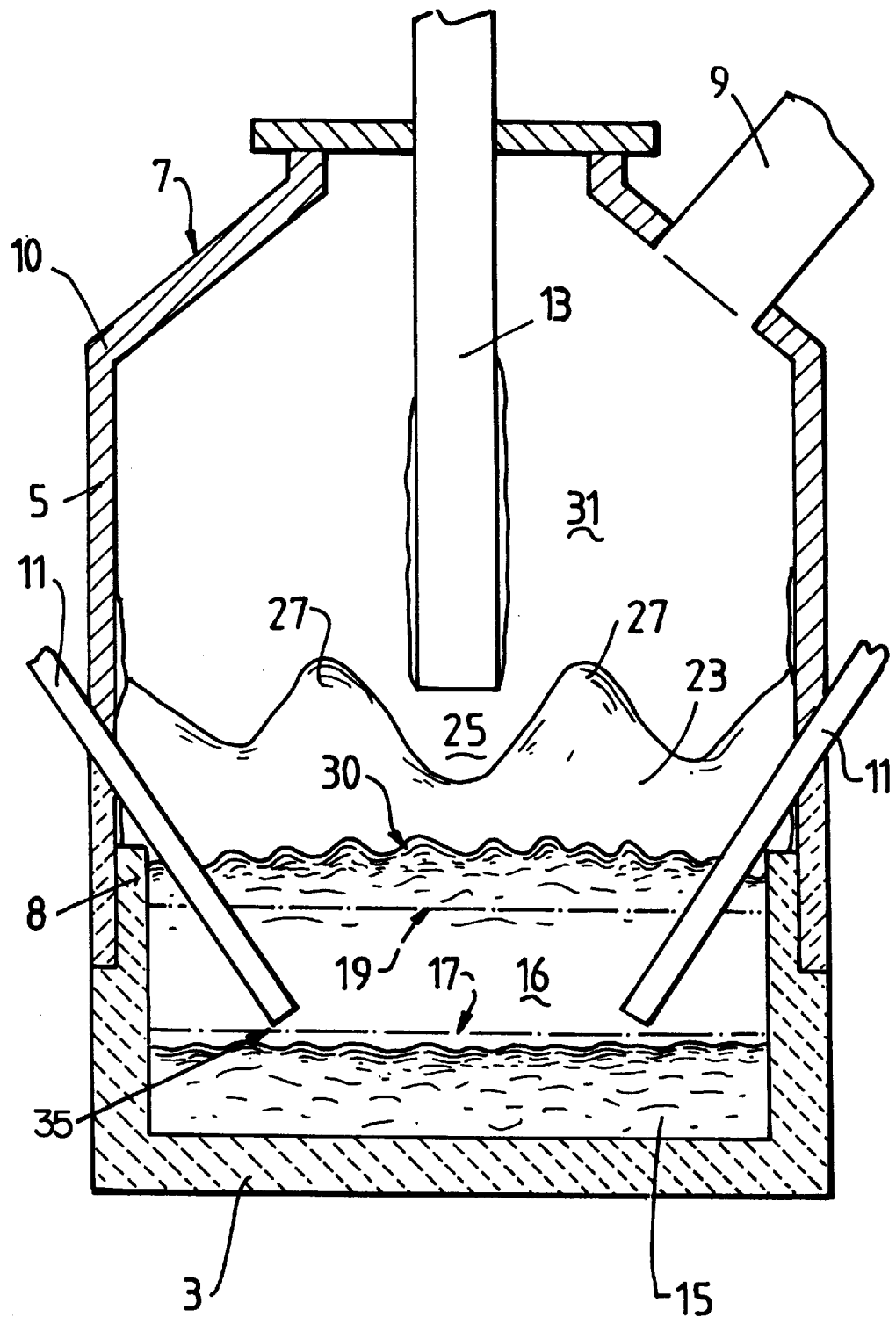

PROCESS OF PRODUCING MOLTEN METALS

FIELD OF THE INVENTION

The present invention relates to a process for producing molten metal (which term includes metal alloys), in particular although by no means exclusively iron, from metalliferous feed material, such as ores, partly reduced ores and metal-containing waste streams, in a metallurgical vessel containing a molten bath.

The present invention relates particularly to a molten metal bath-based direct smelting process for producing molten metal from a metalliferous feed material.

BACKGROUND

The most widely used process for producing molten metal is based on the use of a blast furnace. Solid material is charged into the top of the furnace and molten iron is tapped from the hearth. The solid material includes iron ore (in sinter, lump or pellet form), coke, and fluxes and forms a permeable burden that moves downwardly. Preheated air, which may be oxygen enriched, is injected into the bottom of the furnace and moves upwardly through the permeable bed and generates carbon monoxide and heat by combustion of coke. The result of these reactions is to produce molten iron and slag.

A process that produces iron by reduction of iron ore below the melting point of the iron produced is generally classified as a "direct reduction process" and the product is referred to as DRI.

The FIOR (Fluid Iron Ore Reduction) process is an example of direct reduction process. The process reduces iron ore fines as the fines are gravity-fed through each reactor in a series of fluid bed reactors. The fines are reduced by compressed reducing gas that enters the bottom of the lowest reactor in the series and flows counter-current to the downward movement of fines.

Other direct reduction processes include moving shaft furnace-based processes, static shaft furnace-based processes, rotary hearth-based processes, rotary kiln-based processes, and retort-based processes.

The COREX process produces molten iron directly from coal without the blast furnace requirement of coke. The process includes 2-stage operation in which:

(a) DRI is produced in a shaft furnace from a permeable bed of iron ore (in lump or pellet form), coal and fluxes; and (b) the DRI is then charged without cooling into a connected melter gasifier.

Partial combustion of coal in the fluidised bed of the melter gasifier produces reducing gas for the shaft furnace.

Another known group of processes for producing molten iron is based on cyclone converters in which iron ore is melted by combustion of oxygen and reducing gas in an upper melting cyclone and is smelted in a lower smelter containing a bath of molten iron. The lower smelter generates the reducing gas of the upper melting cyclone.

A process that produces molten metal directly from ores is generally referred to as a "direct smelting process".

One known group of direct smelting processes is based on the use of electric furnaces as the major source of energy for the smelting reactions.

Another known direct smelting process, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen enriched air or oxygen into the slag via a lower row of tuyeres to provide slag agitation and injection of oxygen into the slag via an upper of tuyeres to promote post-combustion. In the Romelt process the metal layer is not an important reaction medium.

Another known group of direct smelting processes that are slag-based is generally described as "deep slag" processes. These processes, such as DIOS and AISI processes, are based on forming a deep layer of slag with 3 regions, namely: an upper region for post-combusting reaction gases with injected oxygen; a lower region for smelting metal oxides to metal; and an intermediate region which separates the upper and lower regions. As with the Romelt process, the metal layer below the slag layer is not an important reaction medium.

Another known direct smelting process which relies on a molten metal layer as a reaction medium, and is generally referred to as the HIsmelt, process, is described in International application PCT/AU96/00197 (WO 96/31627) in the name of the applicant.

The HIsmelt process as described in the International application comprises:

(a) forming a bath of molten iron and slag in a vessel;

(b) injecting into the bath:

(i) metalliferous feed material, typically metal oxides; and (ii) a solid carbonaceous material, typically coal, which acts as a reductant of the metal oxides and a source of energy; and (c) smelting the metalliferous feed material to metal in the metal layer.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there are ascending and thereafter descending droplets or splashes or streams of molten metal and/or slag which provide an effective medium to transfer to the bath the thermal energy generated by post-combusting reaction gases above the bath.

The HIsmelt process as described in the International application is characterised by forming the transition zone by injecting a carrier gas and metalliferous feed material and/or solid carbonaceous material and/or other solid material into the bath through a section of the side of the vessel that is in contact with the bath and/or from above the bath so that the carrier gas and the solid material penetrate the bath and cause molten metal and/or slag to be projected into the space above the surface of the bath.

The HIsmelt process as described in the International application is an improvement over earlier forms of the HIsmelt process which form the transition zone by bottom injection of gas and/or carbonaceous material into the bath which causes droplets and splashes and streams and molten metal and slag to be projected from the bath.

SUMMARY

An object of the present invention is to provide an improved direct smelting process for producing metals from metal oxides (including partially reduced metal oxides).

According to the present invention there is provided a direct smelting process for producing metals from metal oxides (including partially reduced metal oxides) which includes the steps of:

(a) forming a molten bath having a metal layer and a slag layer on the metal layer in a metallurgical vessel;

(b) injecting a metalliferous feed material into the metal layer via one or more than one lance/tuyere and smelting the metalliferous material to metal in the metal layer;

(c) injecting a solid carbonaceous material into the metal layer via one or more than one lance/tuyere in an amount that is sufficient so that the level of dissolved carbon in metal is at least 3 wt % based on the total weight of carbon and metal;

(d) causing upward movement of splashes, droplets, and streams of molten material from the metal layer of the molten bath which:

(i) promotes strong mixing of metal in the slag layer of the molten bath so that the slag layer is maintained in a strongly reducing condition leading to FeO levels below 8 wt % based on the total weight of the slag in the slag layer; and (ii) extends into a space above a nominal quiescent surface of the molten bath to form a transition zone; and (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone.

Typically, molten metal is a major part and slag is the remaining par of the molten material in the splashes, droplets, and streams of molten material from the metal layer. Typically, the splashes, droplets, and streams of molten material entrain further molten material (particularly slag) as they move upwardly. In addition, increasingly, the splashes, droplets, and streams of molten material lose momentum and fall downwardly towards the metal layer. In view of the higher density of metal than slag the relative amount of metal in the molten material in the splashes, droplets, and streams decreases with distance from the metal layer to the point where the transition zone may include small amounts, if any, metal.

The upward movement of splashes, droplets, and streams of molten material from the metal layer ensures that there is strong mixing of metal in the slag layer. The injection of solid carbonaceous material into the metal layer ensures that there are high levels of dissolved carbon in the metal that is mixed in the slag layer. As a consequence of the dissolved carbon in metal in the slag layer and the strong mixing of metal in the slag layer, the slag layer has desirably low levels (ie less than 8 wt %) FeO in the slag.

The term "smelting" is understood herein to mean thermal processing wherein chemical reactions that reduce metal oxides take place to produce liquid metal.

The term "metal layer" is understood herein to mean that region of the bath that is predominantly metal. Specifically, the term covers a region or zone that includes a dispersion of molten metal in a slag continuous volume.

The term "slag layer" is understood herein to mean that region of the bath that is predominantly slag. Specifically, the term covers a region or zone that includes a dispersion of molten metal in a slag continuous volume.

The term "quiescent surface" in the context of the molten bath is understood to mean the surface of the molten bath under process conditions in which there is no gas/solids injection and therefor no bath agitation.

The space above the nominal quiescent surface of the molten bath is hereinafter referred to as the "top space".

It is preferred that the level of dissolved carbon in metal be greater than 4 wt %.

It is preferred that the concentration of FeO in the slag layer be below 6 wt % and more preferably below 5 wt %.

It is preferred that the process further comprises selecting the amount of the solid carbonaceous material injected into the metal layer to be greater than that required for smelting the metalliferous feed and for generating heat to maintain reaction rates such that dust entrained in off-gas leaving the vessel contains at least some excess carbon.

It is preferred that the concentration of solid carbon in dust in off-gas from the vessel be in the range of 5 to 90 wt % (more preferably 20 to 50 wt %) of the weight of dust in the off-gas at a rate of dust generation of 10–50 g/Nm$^3$ in the off-gas.

Preferably step (e) of the process operates at high levels of primary post-combustion.

The term "primary post-combustion" means:

$$\frac{[CO_2] + [H_2O]}{[CO_2] + [H_2O] + [CO] + [H_2]}$$

where:

[$CO_2$]=volume % of $CO_2$ in off-gas;

[$H_2O$]=volume % of $H_2O$ in off-gas;

[CO]=volume % of CO in off-gas; and

[$H_2$]=volume % of $H_2$ in off-gas.

More particularly, the term "primary post-combustion" also mean the post-combustion which results from the smelting process in the absence of any addition of supplementary carbonaceous material for other purposes.

In some instances a supplementary source of solid or gaseous carbonaceous material (such as coal or natural gas) may be injected into the off-gas from the vessel in order to capture thermal energy in the form of chemical energy.

An example of such supplementary injection of carbonaceous material in injection of natural gas which cracks and reforms, and thus cools, the off-gas whilst enriching its fuel value.

The supplementary carbonaceous material may be added in the upper reaches of the vessel or in the off-gas duct after the off-gas has left the vessel.

The addition of supplementary carbonaceous material can be used to lower primary post-combustion in a manner which is virtually independent of the main smelting process in the vessel.

The process of the present invention may operate at a primary post-combustion greater than 40%.

Preferably the process operates at a primary post-combustion greater than 50%.

More preferably the process operates at a primary post-combustion greater than 60%.

The transition zone formed in step (d) (ii) above is important for three reasons.

Firstly, the ascending and thereafter descending splashes, droplets and streams of molten material are an effective means of transferring to the molten bath the heat generated by post-combustion of reaction gases in the top space above the nominal quiescent surface of the bath.

Secondly, the molten material, and particularly the slag, in the transition zone is an effective means of minimising heat loss by radiation via the side wall of the vessel.

Thirdly, dust containing carbon in the transition zone reduces heat loss by radiation to the side walls of the vessel.

A fundamental difference between the process of the present invention and prior art processes is that in the process of the present invention the main smelting region is the metal layer and the main gas oxidation (ie heat generation) region is separated from the metal layer and, more particularly, is in the transition zone and these regions are spatially well separated and heat transfer is via physical movement of molten material between the two regions.

Preferably the upward movement of splashes, droplets, and streams of molten material, particularly slag, that forms the transition zone is generated by injecting the metalliferous feed material and/or the carbonaceous material in a carrier gas through one or more than one lance/tuyere that extend downwardly towards the metal layer.

More preferably, as noted above, the one or more than one lance/tuyere extends through the side walls of the vessel and is angled inwardly and downwardly towards the metal layer.

This injection of the solid material towards and thereafter into the metal layer has the following consequences.

(a) The momentum of the solid material/carrier gas causes the solid material and gas to penetrate the metal layer;
(b) the carbonaceous material, typically coal, is devolatilised and thereby produces gas in the metal layer;
(c) carbon predominantly dissolves into the metal and partially remains as solid;
(d) the metalliferous material is smelted to metal by carbon derived from injected carbon as described above in item (c) and the smelting reaction generates carbon monoxide gas; and
(e) the gases transported into the metal layer and generated via devolatilisation and smelting produce significant buoyancy uplift of molten material, namely molten metal (which includes dissolved carbon) and molten slag (which is drawn into the metal layer from above the metal layer as a consequence of solid/gas injection), and solid carbon from the metal layer which results in upward movement of splashes, droplets and streams of molten material, and these splashes, droplets, and streams entrain further slag as they move through the slag layer.

Another option, although by no means not the only other option, to generate the upward movement of splashes, droplets, and streams of molten material is to inject the metalliferous feed material and the carbonaceous material via one or more than one tuyere in the bottom of the vessel or in side walls of the vessel that contact the metal layer.

The injection of metalliferous feed material and carbonaceous material may be through the same or separate lance (s)/tuyere(s).

It is preferred that the injection of the carrier gas and carbonaceous material and/or metalliferous feed and/or other solid material into the bath be sufficient to project splashes, droplets, and streams of molten material into the space above the bath in a fountain-like manner.

Preferably, the metallurgical vessel includes:

(a) the above-described lances/tuyeres for injecting oxygen-containing gas and lances/tuyeres for injecting solid materials, such as metalliferous material, carbonaceous material (typically coal) and fluxes, into the vessel;
(b) tap holes for discharging molten metal and slag from the vessel; and
(c) one or more off-gas outlet.

The metalliferous feed material may be in any suitable form. For example, it may be in the form of ores, partly reduced ores, DRI (direct reduced iron), iron carbide, millscale, blast furnace dust, sinter fines, BOF dust or a mixture of such materials.

In the case of partly reduced ores, the degree of pre-reduction may range from relatively low levels (eg to FeO) to relatively high levels (eg 70 to 95% metallisation).

In this connection, the process further includes partly reducing metalliferous ores and thereafter injecting the partly reduced ores into the metal layer.

The metalliferous feed material may be pre-heated.

The carrier gas may be any suitable carrier gas.

It is preferred that the carrier gas be an oxygen-deficient gas.

It is preferred that the carrier gas comprise nitrogen.

The oxygen-containing gas may be oxygen, air or oxygen-enriched air containing up to 40% oxygen by volume.

It is preferred that the oxygen-containing gas be air.

It is preferred particularly that the air be pre-heated.

BRIEF DESCRIPTION OF THE DRAWING

The present invention is described further by way of example with reference to the accompanying drawing. The FIGURE is a vertical section through a metallurgical vessel illustrating in schematic from a preferred embodiment of the process of the present invention.

DETAILED DESCRIPTION

The following description is in the context of smelting iron ore to produce molten iron and it is understood that the present invention is not limited to this application and is applicable to any suitable metallic ores and/or concentrates—including partially reduced metallic ores and waste materials.

The vessel shown in the FIGURE has a base 3, side walls 5 which form a generally cylindrical barrel, a roof 7, an upper outlet 9 for off-gases, and tap-holes (not shown) for discharging metal and slag.

The base 3 and a lower section 8 of the side walls 5 are formed from refractory material.

The roof 7 and an upper section 10 of the side walls 5 are formed from water-cooled panels. The panels are described in detail in Australian provisional application PP4426 of the applicant and the disclosure in that application is incorporated herein by cross-reference.

In use, the vessel contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solids into the vessel.

The vessel also includes two solids injection lances/tuyeres 11 extending downwardly and inwardly through the side walls 5 and into the slag layer 16. The position of the lances/tuyeres 11 is selected so that the lower ends are above the quiescent surface 17 of the metal layer 15.

In use, iron ore, solid carbonaceous material (typically coal), and fluxes (typically lime and magnesia) entrained in a carrier gas (typically $N_2$) are injected into the metal layer 15 via the lances/tuyeres 11. The momentum of the solid material/carrier gas causes the solid material and gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and molten slag (drawn into the metal layer 15 from above the metal layer 15 as a consequence of solid/gas/injection) from the metal layer 15 which generates an upward movement of splashes, droplets and streams of molten material and solid carbon, and these splashes, and droplets, and streams entrain slag as they move through the slag layer 16.

The buoyancy uplift of molten material and solid carbon causes substantial agitation in the metal layer 15 and the slag layer 16, with the result that the slag layer 16 expands in volume and has a surface indicated by the arrow 30. The extent of agitation is such that the metal layer 15 and the slag layer 16 are each substantially homogeneous in that there are reasonably uniform temperatures throughout each region—typically, 1450–1550° C.—and reasonably uniform compositions throughout each region.

In addition, the upward movement of splashes, droplets and streams of molten material caused by the buoyancy uplift of molten metal, solid carbon, and slag extends into the top space 31 above the molten material in the vessel and forms a transition zone 23.

In general terms, the slag layer 16 is a liquid continuous volume, with gas bubbles and metal (typically in the form of droplets) therein, and the transition zone 23 is a gas continuous volume with splashes, droplets, and streams of molten material (which is at least predominantly slag at this stage) therein.

The substantial agitation of the metal layer 15 and the slag layer 16 caused by the buoyancy uplift discussed above ensures that there is strong mixing of metal in the slag layer 16. The deliberate injection of solid carbonaceous material into the metal layer 15 ensures that there are high levels of dissolved carbon in the metal that is mixed in the slag layer. As a consequence of the dissolved carbon in metal in the slag layer and the strong mixing of metal in the slag layer, the slag layer has desirably low levels (typically less than 8 wt %) FeO in the slag.

The vessel further includes a lance 13 for injecting an oxygen-containing gas which is centrally located and extends vertically downwardly into the vessel. The position of the lance 13 and the gas flow rate through the lance 13 are selected so that the oxygen-containing gas penetrates the central region of the transition zone 23 and maintains an essentially metal/slag free space 25 around the end of the lance 13.

The injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes droplets, and streams, of molten material in the region of gas injection and the heat is then partially transferred to the metal layer 15 when the metal/slag returns to the metal layer 15.

The free space 25 is important to achieving high levels of post combustion, ie more than 40%, because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten material is to shape the transition zone 23 around the lower region of the lance 13—generally identified by the numerals 27. This shaped region provides a partial barrier to heat transfer by radiation to the side walls 5.

Moreover, the ascending and descending droplets, splashes and streams of molten material is an effective means of transferring heat from the transition zone 23 to the molten bath with the result that the temperature of the transition zone 23 in the region of the side walls 5 is of the order of 1450° C.–1550° C.

The preferred embodiment of the process of the present invention includes selecting the amount of the solid carbonaceous material added to the bath to be greater than that required for smelting the iron ore introduced to the bath so that solid carbon in the form of soot or char is carried through the bath and the transition zone 23. As a result, carbon is present in significant quantity in dust in the off-gas from the vessel. Carbon may also be present in small amounts in slag which is tapped from the vessel.

It is preferred that the solid carbonaceous material injected into the metal layer 15 be sufficient to maintain;

(a) a concentration of at least 3 wt % carbon in metal in the bath;

(b) FeO levels below 8 wt % in the slag in the slag layer 16 and in the transition zone 23; and (c) at least 5% carbon in dust entrained in the off-gas from vessel.

The advantages of operating the method of the present invention with excess carbon are two fold.

Firstly, as noted above, high levels of dissolved carbon in metal in the bath and strong mixing of metal in the slag layer 16 ensures that the slag layer is maintained in a strongly reduced condition by virtue of metal-slag mixing. Slag with a low FeO content thus obtained avoids operational problems associated with uncontrolled, potentially rapid reaction between high FeO slag and carbon-rich metal.

Secondly, the bath is maintained close to saturation with respect to dissolved carbon and the carbon content of metal does not need to be controlled explicitly. Loss of carbon from metal is a serious issue from a plant operation's view point since the liquidus of the metal (for the iron-carbon system) changes significantly on either side of the eutectic. The presence of excess carbon in the bath means that the system is self-correcting to a degree, with more time for corrective action available to the operator in the event of a process disturbance.

The degree of post-combustion achieved in the vessel is effectively controlled by the amount of excess carbon being carried from the vessel as dust in the off-gas. This results in unused carbon being carried from the vessel which may be recycled to the vessel.

The applicant has carrier out extensive pilot plant work with the vessel shown in the FIGURE and described above in accordance with the process conditions described above.

The pilot plant work evaluated the vessel and investigated the process under a wide range of different:

(a) feed materials;

(b) solids and gas injection rates;

(c) slag:metal ratios;

(d) operating temperatures; and (e) apparatus set-ups.

Table 1 below sets out relevant data during stable operating conditions for one part of the pilot plant work.

|  |  | STABLE OPERATION |
| --- | --- | --- |
| Bath Temperature | (° C.) | 1450 |
| Operating Pressure | (bar g) | 0.5 |
| HAB Air | (kNm³/h) | 26.0 |
| Oxygen in HAB | (%) | 20.5 |
| HAB Temperature | (C.) | 1200 |
| DSO Ore | (t/h) | 9.7 |
| Coal | (t/h) | 6.1 |
| Calcined Flux | (t/h) | 1.4 |
| Ore Feed Temp | (C.) | 25.0 |
| Hot Metal | (t/h) | 6.1 |
| Slag | (t/h) | 2.7 |
| Post Combustion | (%) | 60.0 |
| Offgas Temperature | (C.) | 1450 |
| Heat Transfer to Bath | (MW) | 17.3 |
| Heat Loss to Panels | (MW) | 8.0 |
| Coal Rate | (kg/thm) | 1003 |

The iron ore was sourced from Hamersley as a normal fine direct shipping ore and contained 64.6% iron, 4.21% $SiO_2$, and 2.78% $Al_2O_3$ on a dry basis.

An anthracite coal was used both as a reductant and a source of carbon and hydrogen to combust and supply energy to the process. The coal had a calorific value of 30.7 MJ/kg, an ash content of 10%, and a volatile level of 9.5%. Other characteristics included 79.82% total carbon, 1.8% $H_2O$, 1.59% $N_2$, 3.09% $O_2$, and 3.09% $H_2$.

The process was operated to maintain a slag basicity of 1.3 ($CaO/SiO_2$ ratio) using a combination of fluxes of lime and magnesia. The magnesia contributed MgO thereby reducing the corrosiveness of the slag to the refractory by maintaining appropriate levels of MgO in the slag.

Under stable operating conditions, relatively low heat losses of 8 MW were recorded. The productivity was 6.1 t/h of hot metal. Solid injection rates were 9.7 t/h of ore fines and 6.1 t/h of coal along with 1.4 t/h of flux. A coal rate of 1000 kg coal/t hot metal was achieved. Operating results under these conditions produced a dust carbon level of 25 wt % and a FeO in the slag of 4 wt % and a bath carbon of 4 wt %.

Many modifications may be made to the preferred embodiments of the process of the present invention as described above without departing from the spirit and scope of the present invention.

What is claimed is:

1. A direct smelting process for producing metal from an iron-containing metalliferous feed material which includes the steps of:

(a) forming a molten bath having a metal layer and a slag layer on the metal layer in a metallurgical vessel;

(b) injecting iron-containing metalliferous feed material into the metal layer via one or more than one lance/tuyere and smelting the metalliferous material to metal at least predominantly in the metal layer;

(c) injecting solid carbonaceous material into the metal layer via one or more than one lance/tuyere;

(d) causing upward movement of splashes, droplets, and streams of molten material from the metal layer of the molten bath which:

(i) promotes strong mixing of metal in the slag layer of the molten bath; and (ii) extends into a space above a nominal quiescent surface of the molten bath to form a transition zone; and (e) injecting an oxygen-containing gas into the vessel via one or more than one lance/tuyere to post-combustion reaction gases released from the molten bath, whereby the ascending and thereafter descending splashes, droplets and streams of molten material in the transition zone facilitate heat transfer to the molten bath; and wherein the amount of solid carbonaceous material supplied in step (c) is selected to be sufficient to maintain:

(i) a concentration of at least 3 wt % dissolved carbon in metal in the molten bath based on the total weight of carbon and metal;

(ii) levels of iron oxide (FeO) below 8 wt % based on the total weight of the slag in the slag layer; and (iii) at least 5 wt % carbon in dust, based on the weight of dust, entrained in off-gas leaving the vessel.

2. The process defined in claim 1 wherein the level of dissolved carbon in metal is greater than 4 wt %.

3. The process defined in claim 1 wherein the concentration of FeO in slag in the slag layer is below 6 wt %.

4. The process defined in claim 3 wherein the FeO concentration is below 5 wt %.

5. The process defined in claim 1 wherein step (d) includes injecting the metalliferous feed material and the carbonaceous material in a carrier gas through one or more than one lance/tuyere that extend downwardly towards the metal layer and thereby causing upward movement of splashes, droplets, and streams of molten material into the space above the nominal quiescent surface to from the transition zone.

6. The process defined in claim 1 wherein the concentration of solid carbon in dust in off-gas from the vessel is in the range of 5 to 90 wt % of the weight of dust in the off-gas which corresponds to a rate of dust generation of 10–50 g/Nm³ in the off-gas.

7. The process defined in claim 1 including operating the process at primary post-combustion levels greater than 40%.

8. The process defined in claim 7 including operating the process at primary post-combustion levels greater than 50%.

* * * * *